United States Patent
Chan et al.

(10) Patent No.: US 8,848,585 B2
(45) Date of Patent: Sep. 30, 2014

(54) SYSTEM AND METHOD OF POWER MANAGEMENT FOR A DEVICE WITH MULTIPLE NETWORK INTERFACES

(75) Inventors: Hinghung Anthony Chan, Plano, TX (US); Justin Zengjun Xiang, Vernon Hills, IL (US); James Han, Naperville, IL (US); Behcet Sarikaya, Wylie, TX (US)

(73) Assignee: Futurewei Technologies, Inc., Plano, TX (US)

( * ) Notice: Subject to any disclaimer, the term of this patent is extended or adjusted under 35 U.S.C. 154(b) by 372 days.

(21) Appl. No.: 12/714,278

(22) Filed: Feb. 26, 2010

(65) Prior Publication Data

US 2010/0226298 A1 Sep. 9, 2010

Related U.S. Application Data (60) Provisional application No. 61/158,206, filed on Mar. 6, 2009, provisional application No. 61/177,171, filed on May 11, 2009, provisional application No. 61/177,559, filed on May 12, 2009.

(51) Int. Cl.
*H04W 52/02* (2009.01)

(52) U.S. Cl.
CPC ............ *H04W 52/0241* (2013.01); *Y02B 60/50* (2013.01)
USPC ......................................... 370/311

(58) Field of Classification Search
CPC ............... H04W 52/0241; H04W 52/0209; H04W 52/02; H04W 52/0203; H04W 52/0212; H04W 52/0225; H04W 52/0235; H04W 52/0261; H04W 52/0267; Y02B 60/50
USPC ................... 370/311, 332, 338; 455/436, 522
See application file for complete search history.

(56) References Cited

U.S. PATENT DOCUMENTS

| | | |
|---|---|---|
| 2003/0003973 A1 | 1/2003 | Zhou et al. |
| 2004/0203389 A1 | 10/2004 | Kojima et al. |
| 2005/0036468 A1 | 2/2005 | Miyabayashi et al. |
| 2005/0201291 A1 | 9/2005 | Gluck |

(Continued)

FOREIGN PATENT DOCUMENTS

| | | |
|---|---|---|
| EP | 1679917 | 7/2006 |
| EP | 1841142 | 10/2007 |

(Continued)

OTHER PUBLICATIONS

"Part 11: Wireless LAN Medium Access Control (MAC) and Physical Layer (PHY) Specifications," IEEE Standard for Information technology—Telecommunications and Information exchange between systems—Local and metropolitan area networks—Specific requirements, Jun. 12, 2007, 1233 pages, vol. 802.11, New York, NY.

(Continued)

*Primary Examiner* — Pao Sinkantarakorn
*Assistant Examiner* — Richard K Chang
(74) *Attorney, Agent, or Firm* — Slater & Matsil, L.L.P.

(57) ABSTRACT

An embodiment method for managing power of user device having a plurality of interfaces includes mapping centralized reachability states to physical power states of the interface and controlling the physical power states based on the mapping. Controlling includes transmitting a signal to the user device.

24 Claims, 8 Drawing Sheets

(56) References Cited

U.S. PATENT DOCUMENTS

| | | |
|---|---|---|
| 2007/0263574 A1* | 11/2007 | Lu et al. .................. 370/338 |
| 2008/0028122 A1 | 1/2008 | Park |
| 2009/0268690 A1* | 10/2009 | Sebire ..................... 370/332 |
| 2009/0307522 A1 | 12/2009 | Olson et al. |
| 2009/0325608 A1* | 12/2009 | Cheng et al. ............. 455/458 |
| 2010/0009676 A1* | 1/2010 | Cormier et al. .......... 455/426.1 |
| 2010/0067434 A1* | 3/2010 | Siu et al. .................. 370/328 |
| 2012/0276904 A1 | 11/2012 | Bachmann et al. |
| 2012/0289278 A1* | 11/2012 | Huschke et al. .......... 455/522 |

FOREIGN PATENT DOCUMENTS

| | | |
|---|---|---|
| FR | 2863810 | 6/2005 |
| JP | 2002-314475 A | 10/2002 |
| JP | 2003-169379 A | 6/2003 |
| JP | 2003-318771 A | 11/2003 |
| JP | 2005-020477 A | 1/2005 |
| JP | 2006-048630 A | 2/2006 |
| JP | 2009-531891 A | 9/2009 |
| WO | WO2004/008693 | 1/2004 |
| WO | WO 2005/067322 A1 | 7/2005 |
| WO | WO2006/126062 | 11/2006 |
| WO | WO 2007/110138 A1 | 10/2007 |
| WO | WO2008/042142 | 4/2008 |

OTHER PUBLICATIONS

"Part 16: Air Interface for Fixed and Mobile Broadband Wireless Access Systems," "Amendment 2: Physical and Medium Access Control Layers for Combined Fixed and Mobile Operation in Licensed Bands," and "Corrigendum 1," IEEE Standard for Local and metropolitan area networks, Feb. 28, 2006, 864 pages, vol. 802. 16e, New York, NY.

"$3^{rd}$ Generation Partnership Project; Technical Specification Group Services and System Aspects; 3GPP System Architecture Evolution: Report on Technical Options and Conclusions (Release 8)," Global System for Mobile Communications, Sep. 2008, 234 pages, TR 23.882, V8.0.0.

Acquaviva, A. et al., "Remote Power Control of Wireless Network Interfaces", Proceedings PATMOS, XP 007919649, http://citeseer. 1st.psu.edu/viewdoc/summary?doi=10.1.1.90.7847, Jan. 1, 2003, 10 pages.

Notification of Transmittal of the International Search Report and the Written Opinion of the International Searching Authority, or the Declaration, PCT/CN/2010/070901, filed Mar. 7, 2010, Date of mailing Jun. 17, 2010, 13 pages.

European Communication dated Nov. 25, 2011, European Search Report for Application Serial No. 10748347.1-2416, PCT/CN2010/ 070901, Huawei Technologies, Co., Ltd., date of search Nov. 25, 2011, 10 pages.

"Korean Intellectual Property Office Notice to Submit a Response," Patent Application No. 10-2011-7022094, Applicant: Huawei Technologies Co., Ltd., 6 pages.

First Chinese Office Action, Chinese Application No. 201080006504.4, mailing date: Apr. 12, 2013, 19 pages. (with Partial Translation).

"Notice of Reason for Rejection," Japanese Application No. 2011-552315, mailing date: Apr. 2, 2013, 10 pages.

* cited by examiner

Figure 1

PRIOR ART

Figure 2

PRIOR ART

PRIOR ART

SYSTEM AND METHOD OF POWER MANAGEMENT FOR A DEVICE WITH MULTIPLE NETWORK INTERFACES

CROSS REFERENCE TO RELATED APPLICATIONS

This patent application claims priority to U.S. Provisional Application No. 61/158,206 filed on Mar. 6, 2009, entitled "An Overlap Power Management for Device with Multiple Network Interfaces Each with Its Own Power Management," U.S. Provisional Application No. 61/177,171 filed on May 11, 2009, entitled "System and Method of Power Management for a Device with Multiple Network Interfaces," U.S. Provisional Application No. 61/177,559 filed on May 12, 2009, entitled "Centralized Power Management for Device with Multiple Network Interfaces," all of which applications are incorporated by reference herein in their entirety.

TECHNICAL FIELD

The present invention relates generally to power management systems, and more particularly to a system and method for centralized power management for a device with multiple network interfaces.

BACKGROUND

Wireless communication systems are widely used to provide voice and data services for multiple users using a variety of access terminals such as cellular telephones, laptop computers and various multimedia devices. Such communication systems can encompass local area networks, such as IEEE 802.11 networks, cellular telephone and/or mobile broadband networks. The communication systems can use one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of system types or partnerships such as, General Packet Radio Service (GPRS), 3rd-Generation standards (3G), Worldwide Interoperability for Microwave Access (WiMAX), Universal Mobile Telecommunications System (UMTS), the 3rd Generation Partnership Project (3GPP), IEEE 802.11 networks, Evolution-Data Optimized EV-DO, or Long Term Evolution (LTE).

Figure 1:
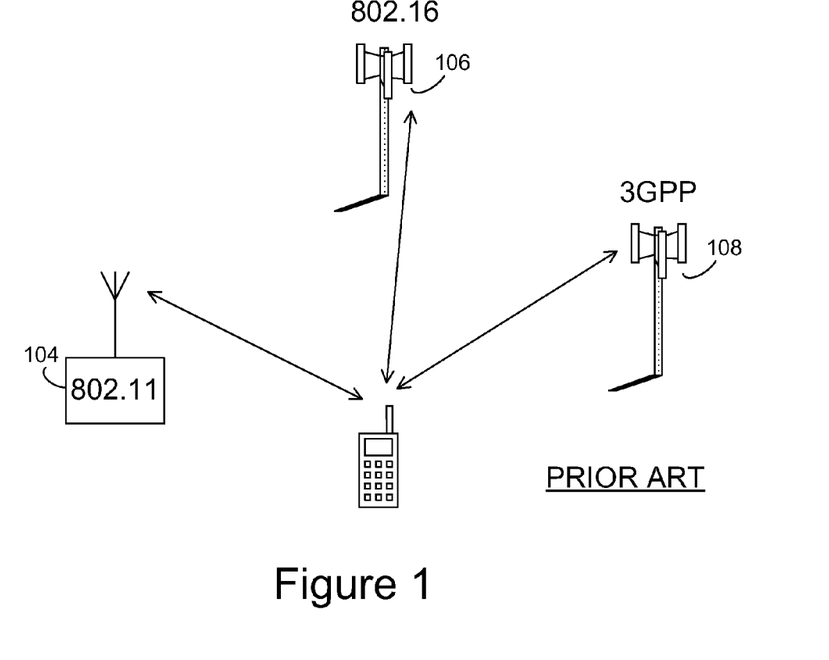
FIG. 1 illustrates a diagram of a mobile broadband system.

As wireless networks have become more pervasive, many user devices are now configured to access more than one wireless network. For example, as shown in FIG. 1, user device 102, is configured to access three networks, for example IEEE 802.11 network 104, IEEE 802.16 network 106, and 3GPP network 108. In such a multiple-interface device, each interface may involve other network technologies, such as, but are not limited to GSM, GPRS, LTE, WiMAX, CDMA2000, WLAN, etc. These individual wireless technologies may use different wireless access technologies that include but are not limited to TDMA, CDMA, or OFDMA.

Figure 2:
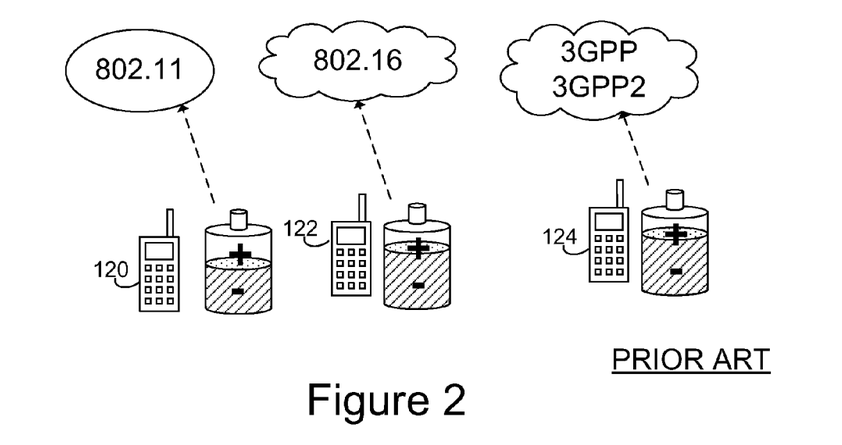
FIG. 2 illustrates a diagram of three single interface user devices.

When multiple interfaces in a user device shares the same battery, and if power consumption is optimized only within each individual interface technology, the user device may consume more power than a user device having a single interface. FIG. 2 illustrates three single interface user devices 120, 122 and 124, represented by a cellular phone and a battery, that individually operate on an 802.11, 802.16, and a 3GPP or 3GPP2 network, respectively. Each of these devices will drain their respective battery at a rate commensurate with normal operation of the single interface device. As the wireless device with a single radio interface connects to a network, the power management for the radio interface is specific to the network technology of that interface and independent of other network technologies. To achieve longer battery life, the single interface may optimize its power consumption within its specific technology.

Figure 3:
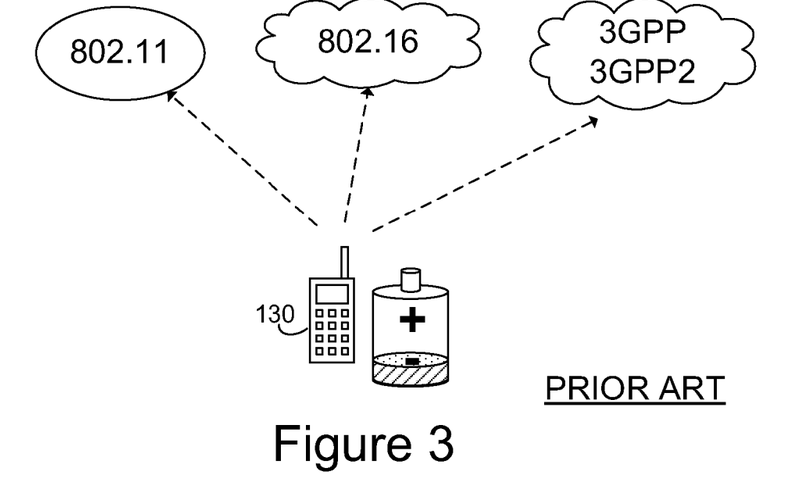
FIG. 3 illustrates a diagram of a multiple interface user device.

A multiple-interface device, however, may drain more power than a single interface device because all interfaces may be simultaneously active and/or periodically receiving transmissions from each of their respective networks. For example, FIG. 3 illustrates the battery drain of multiple interface device 130, represented by a cellular phone and a single battery that interfaces with an 802.11, 802.16 and a 3GPP network.

In the field of power management systems, what is needed are systems and methods that better optimize power consumption for multiple-interface devices.

SUMMARY OF THE INVENTION

In accordance with an embodiment, a method for managing power of user device having a plurality of interfaces includes mapping centralized reachability states to physical power states of the interface and controlling the physical power states based on the mapping. Controlling includes transmitting a signal to the user device.

In accordance with another embodiment, a method of operating a user device having a first wireless interface configured to communicate with a first wireless network and second wireless interface configured to communicate with a second wireless network is disclosed. The method includes receiving a transmission from a first wireless network on a first wireless interface while the first wireless interface is in a reachable state and the second wireless interface is in a non-reachable state. The transmission includes a message that a second wireless network needs to access the second wireless interface. The method further includes placing the second wireless interface into a reachable state after receiving the transmission.

In accordance with a another embodiment, a method of operating a wireless base station configured to transmit to user devices on a first network is disclosed. The method includes determining a reachability state of a first wireless user device. If the first wireless user device is in a reachable directly state, based on the determining, a message is sent to the first wireless user device via the first network. If the first wireless user device is in a reachable via another interface state, a message is forwarded to a second wireless network in which the first wireless user device is in a reachable directly state.

In accordance with another embodiment, a wireless communications system includes a first base station on a first network, where the first base station is configured to communicate with a second base station on a second network, and the first base station is configured to communicate with a user device having a first interface and a second interface. The first interface is configured to communicate with the first network and the second interface is configured to communicate with the second network. The system also includes a map of centralized reachability states and corresponding power states for the user device. The reachability states include a reachable directly state, a reachable via another interface state, and a not reachable state.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to embodiments in specific contexts, for example, a centralized power management system that enables integrated power management with views of requirements and power consumption of a number of device interfaces. In some embodiments, a centralized power management system for multiple-interface devices is used without changing the existing power management states of the individual network technology. Embodiment devices include, but are not limited to personal computers, network servers, set top boxes, and other network devices, as examples.

Figure 4:
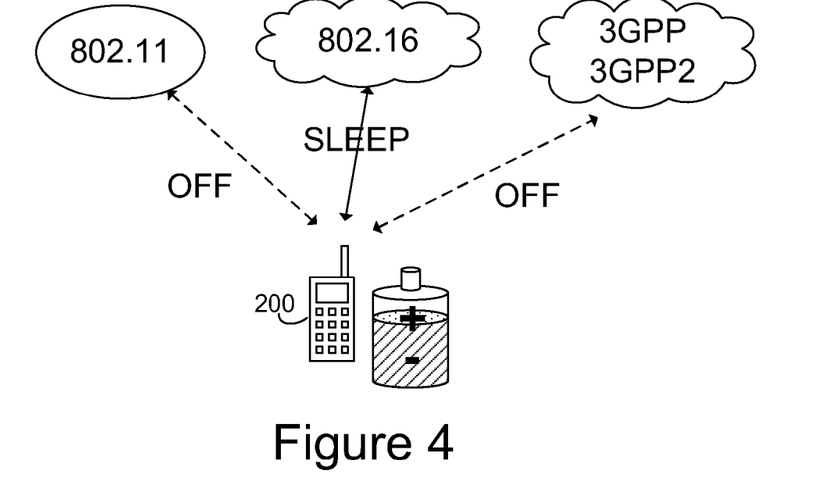
FIG. 4 illustrates an embodiment multiple interface user device.

In one embodiment of the centralized power management system, the system has different power configurations for a multiple-interface device. The centralized power management system chooses a power configuration at any time to minimize power consumption in order to optimize battery life. A configuration corresponds to placing each individual interface into one of its power management states defined for that technology. Such a configuration may include, but is not limited to the example shown in FIG. 4, which illustrates multiple-interface user device 200 configured to operate on an 802.11 network, an 802.16, and a 3GPP or 3GPP2 network. In this example, the power management state of each interface technology is "OFF" for the 802.11 network interface, "SLEEP" for the 802.16 network interface, and "OFF" for the 3GPP or 3GPP2 network interface. In alternative embodiments of the present invention, greater or fewer than three interfaces can be used. Furthermore, different networks, or a different combination of networks can be implemented for each interface.

In embodiments of the present invention, a centralized power management system uses a common set of centralized reachability states. In some embodiments, the centralized power management system uses existing power saving states of the individual technologies to define a common set of centralized reachability states. The centralized reachability states may include, but are not limited to, "reachable (directly)", "reachable (via another interface)", and "not reachable." The relationship between the centralized reachability states and the power management states of an interface is defined for each network technology. Examples of individual technology specific power management states are shown in Table 1. In other embodiments, other individual power management states are possible. Alternative embodiments also encompass other technologies besides those shown in Table 1.

Figure 5:
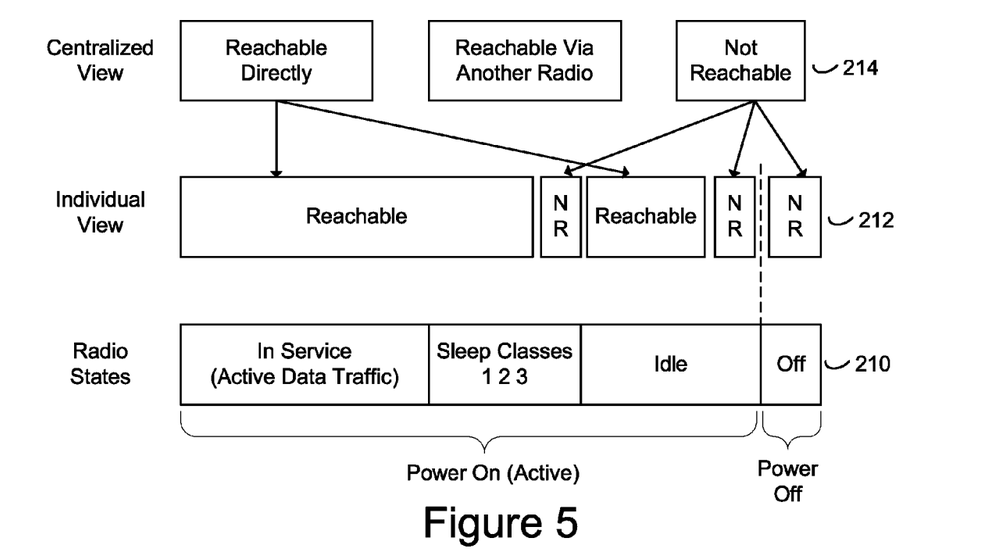
FIG. 5 illustrates an embodiment centralized reachability mapping for an IEEE 802.16 system.

FIG. 5 illustrates an embodiment centralized reachability mapping for an IEEE 802.16 system. Row 210 depicts the various power mode states for an IEEE 802.16 interface, including "In Service," which represents an active power mode, "Sleep Classes 1, 2, 3," which represents various sleep modes, "Idle," and "Off." Row 212 depicts the individual reachability view. It can be seen in this example, that the 802.16 interface is reachable in the "In Service" mode and in portions of the "Sleep" and "Idle" modes. The non-reachable states, labeled as "NR" occur when the interface has a disabled receiver (See Table 1), or when the device is outside of its respective service area. Row 214 represents centralized reachability states with respect to the network. Here, the 802.16 device is "reachable directly" when the individual device is reachable in the individual view, and is "not reachable" when the individual device is in a "not reachable" mode,

TABLE 1

Physical Power Management States In Different Network Technologies.

| System | Mode/State | TX | RX | Register | Control Signalling | Bearer Traffic | Wakeup Time |
|---|---|---|---|---|---|---|---|
| 802.11 | Active | Full | Full | Yes | Yes | Yes | N/A |
| | Power Save (PS) | No | DTIMs | Yes | DTIMs Only | No | Long |
| | Extended PS (Sleep) | No | Some DTIMs | Yes | Some DTIMs | No | >PS |
| | Off | No | No | No | No | No | Power-up |

TABLE 1-continued

Physical Power Management States In Different Network Technologies.

| System | Mode/State | TX | RX | Register | Control Signalling | Bearer Traffic | Wakeup Time |
|---|---|---|---|---|---|---|---|
| 802.16 | Active | Full | Full | Yes | Yes | Yes | N/A |
| | Sleep Classes 1, 2, 3 | Partial | Partial | Yes | Yes | Yes | Quick |
| | Idle | No | Wakeup Paging Only | No | Wakeup paging only | No | Long |
| | Off | No | No | Yes | No | No | Power-up |
| 3GPP | Active | Full | Full | Yes | Yes | Yes | N/A |
| | Control Hold | Partial | Partial | Yes | Yes | Yes | Quick |
| | Suspended | Partial | Partial | Yes | Yes | Yes | >Control Hold |
| | Dormant | Little | V. Limited | Yes | V. Limited | Burst | Long |
| | Off | No | No | No | No | No | Power-up |
| 3GPP2 | Connected | Full | Full | Yes | Yes | Yes | N/A |
| | Idle (camped) | Partial | Partial | Yes | Yes | No | Quick |
| | I (not camped) | Partial | Partial | No | Partial | No | Long (scan/camp) |
| | Off | No | No | No | No | No | Power-up |

Figure 6:
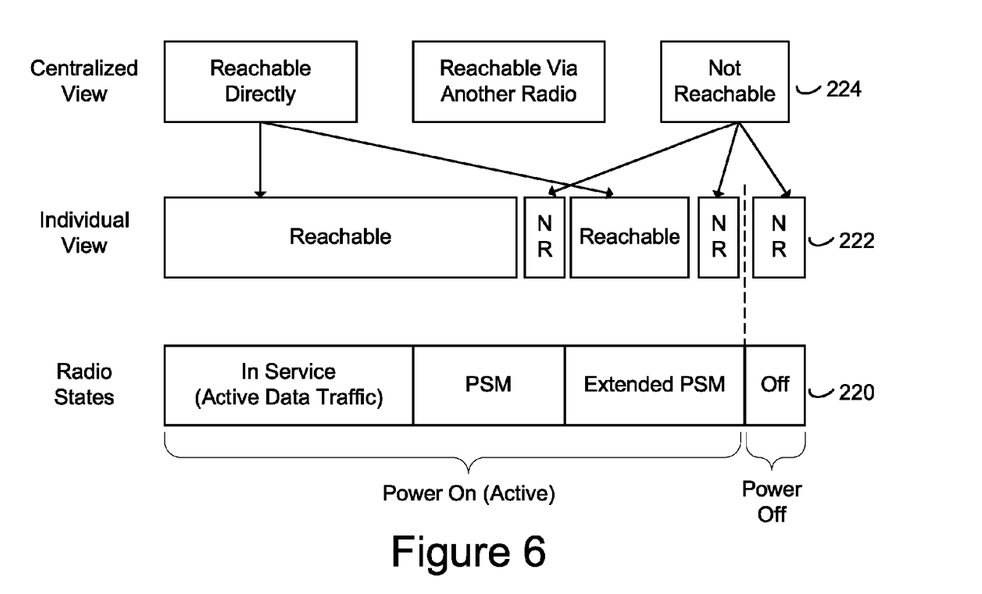
FIG. 6 illustrates an embodiment centralized reachability mapping for an IEEE 802.11 system.

FIG. 6 illustrates an embodiment centralized reachability mapping for an IEEE 802.11 system. Row 220 depicts the various power mode states for an IEEE 802.11 interface, including "In Service," which represents an "Active Power Mode," "Power Save Modes (PSM)," "Extended PSM" and "Off." Row 222 depicts an individual reachability view. It can be seen in this example, that the 802.11 interface is reachable in the "In Service" mode and in portions of the "PSM" and "Extended PSM" modes. The non-reachable states, labeled as "NR" occur when the interface has a disabled receiver (See Table 1), or when the device is outside of its respective service area. Row 224 represents centralized reachability states with respect to the network. Here, the 802.11 device is "reachable directly" when the individual device is reachable in the individual view, and is "not reachable" when the individual device is "not reachable."

Figure 7:
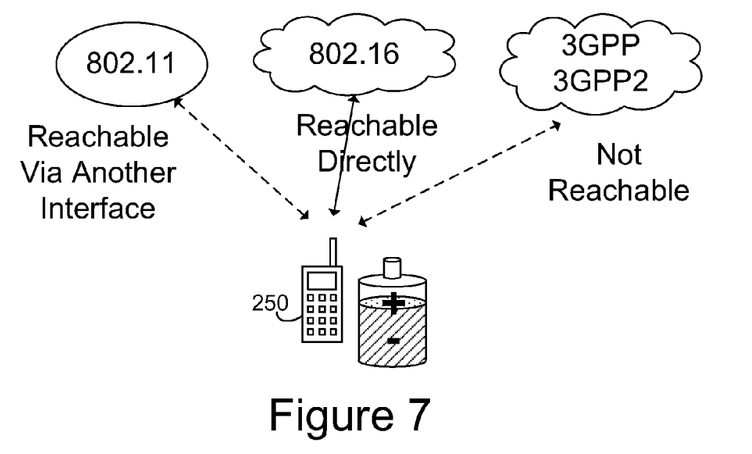
FIG. 7 illustrates central reachability states of an embodiment multiple interface user device.

In one embodiment, the system has different power configurations for a multiple-interface device. The embodiment centralized power management may choose the configuration at any time to minimize power consumption in order to optimize the battery life of the individual multiple-interface device. A configuration corresponds to putting each individual interface into one of a set of reachability states. Such a configuration may include, but is not limited to the example shown in FIG. 7, which shows the reachability state of each interface of user device 250. Here, device 250 is reachable directly via the 802.16 interface, not reachable via the 3GPP or 3GPP2 interface, and reachable via another interface via the 802.11 interface. In this example, the 802.16 interface may be in an active state, the 802.11 interface may be shut down, and the 3GPP or 3GPP2 interface may be deselected by the user. In this case, if the 802.11 network has a message for user device 250, the 802.11 can coordinate with the 802.16 system and send the message to user device 250 via the 802.16 interface. If it is necessary for the 802.11 system to communicate with user device 250, it can submit a request for the user device 250 to turn on its 802.11 interface for operation in an active mode. In one embodiment, the change of the power state of user device 250 will cause a corresponding change in the centralized reachability state for user device 250.

In embodiment power saving mechanisms, such as sleep mode, a user device collaborates with the network with respect to receiving pages. For example, placing a user device, such as a cell-phone, in sleep mode means that user device is off (e.g., the receiver is powered down) but wakes up at regular intervals momentarily to check whether it is being paged with incoming call. If not, the user device returns to sleep mode. The user device and the network are synchronized such that the network does not page the user device when the receiver is deactivated, but pages the user device during the time intervals the when phone is momentarily active. In order to accomplish such a collaboration between the network and the user device, standardized, vendor independent, messages are used in an embodiment. Once standardized messages have been established, the network and user device will operate using power saving mechanisms.

In embodiments, reachability states are used to provide a level of agreement between the network and the user device via interface messages or language. Such embodiment interface messages are standardized and vendor independent in a way that the network and the user device may be manufactured separately. During system operation, once the user device and the network have exchanged information with each other about the reachability states, the user device turns off and/or powers down some of its interfaces. The network will also understand that it will only page the device through those interfaces that are reachable directly. If there is paging from the network to the device through an interface that is only reachable via another interface, the network will redirect that paging to a different interface which is reachable directly on the user device.

In one example, embodiment power management methods are implemented within the paging system of a network. Here the paging system intercepts incoming pages and communicates with other networks in order to handle the incoming pages. The paging system then determines whether the paging message should be forwarded to the paging system in a different network where the radio of the device is reachable directly. Such a determination is made according to embodiment systems and methods. In an embodiment, paging systems of different networks exchange messages about the reachability states of the device, so they know how to handle incoming paging messages. In some embodiments, each of these networks may correspond to a separate interface on the user device. In other embodiments, the coordinating networks can represent a subset or a superset of available interfaces of the corresponding user device.

Figure 8:
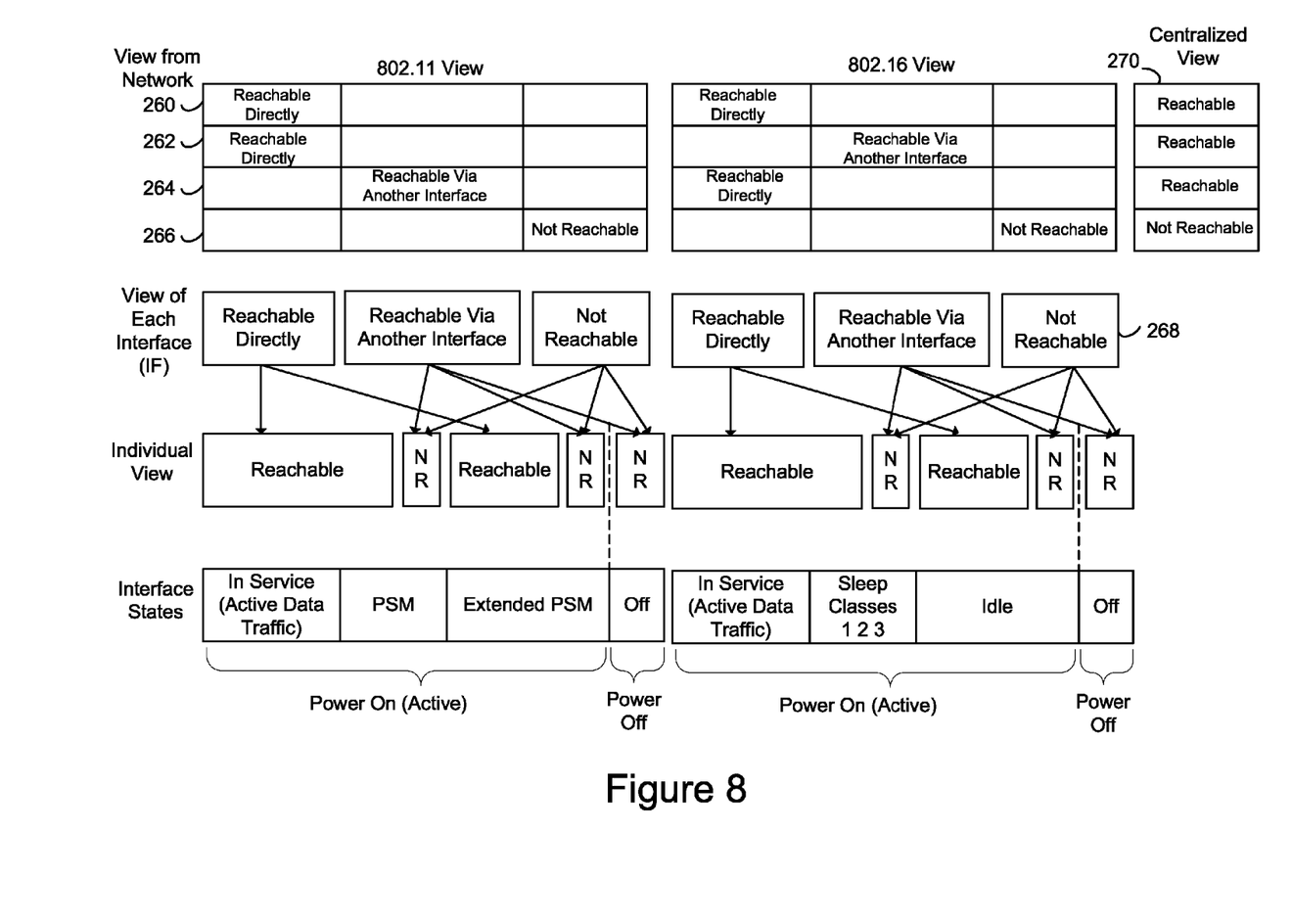
FIG. 8 illustrates an embodiment reachability mapping for a user device with two interfaces.

FIG. 8 illustrates an embodiment reachability mapping for a user device with two interfaces: an IEEE 802.11 interface and an IEEE 802.16 interface. In this embodiment, the centralized view considers all individual device interfaces reachable as long as at least one of its interfaces is reachable directly. Rows 260, 262, 264 and 266 represent various combinations of the individual reachability states for the 802.11 and 802.16 interfaces. For example, Row 260 represents the case where both interfaces are reachable directly, row 262 represents the case where only 802.11 interface is reachable directly, row 264 represents the case where only the 802.16 interface is reachable directly, and row 266 represents the case where neither interfaces are reachable. Row 268 represents the individual interface view. Here, the "reachable via another interface" state represents the case where the respective interface is shut down, such as when the interface is physically turned-off, but the user device is reachable via another interface. For example, if the 802.11 interface was powered down, the 802.11 network can still reach the user device via the 802.16 network.

Figure 9:
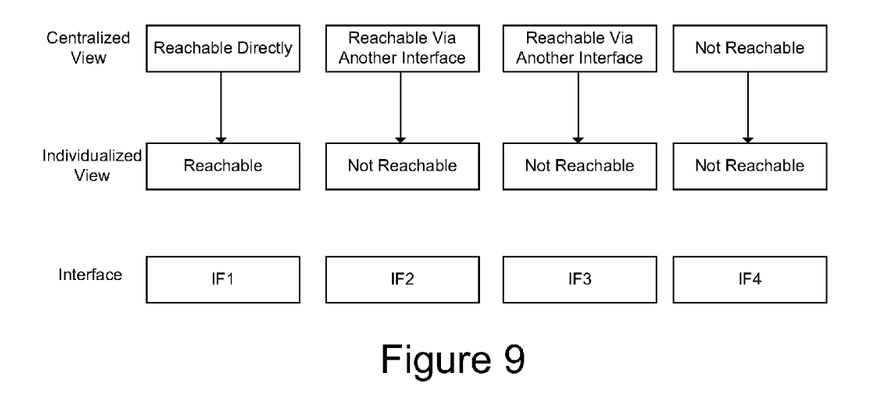
FIG. 9 illustrates an embodiment reachability mapping for a user device having four interfaces.

In alternative embodiments, the reachability mapping shown in FIG. 8 can be extended to incorporate an arbitrary number of interfaces using different network types and different combinations of networks. For example, FIG. 9 illustrates an embodiment mapping for a user device having four interfaces IF1, IF2, IF3 and IF4. Each of these interfaces can represent a physical device interface in an embodiment (i.e. 802.11, 3GPP, GSM, etc.). Here, IF1 is "reachable" in the individualized view and "reachable directly" in the centralized view. Interfaces IF2 and IF3 are "not reachable" in the individualized view, but are "reachable via another interface" in the centralized view. Interface IF4 is "not reachable," both in the individualized view and in the centralized view.

Figure 10:
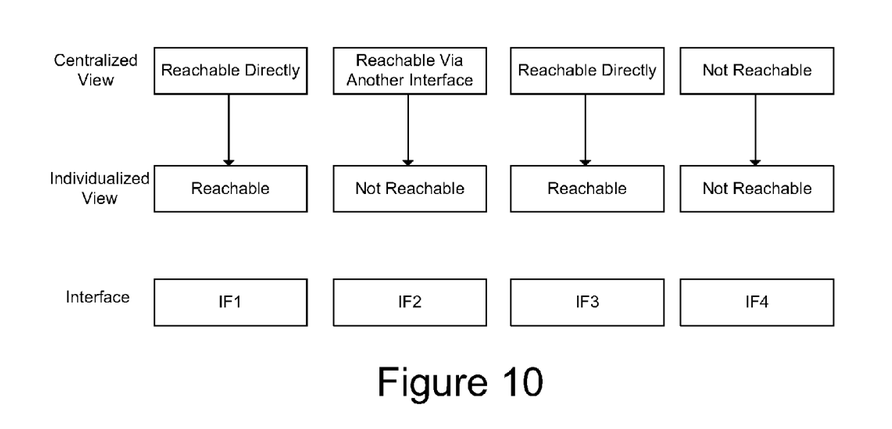
FIG. 10 illustrates another embodiment reachability mapping for a user device having four interfaces.

The example of FIG. 10 also illustrates an embodiment mapping for a user device having four interfaces IF1, IF2, IF3 and IF4. Here, IF1 and IF3 are "reachable" in the individualized view and "reachable directly" in the centralized view. Interface IF2 is "not reachable" in the individualized view, but is "reachable via another interface" in the centralized view. Interface IF4 is "not reachable," both in the individualized view and in the centralized view. In alternative embodiments, the number of interfaces can be greater or fewer than the four shown, and the number of reachability states can be different.

Figure 11:
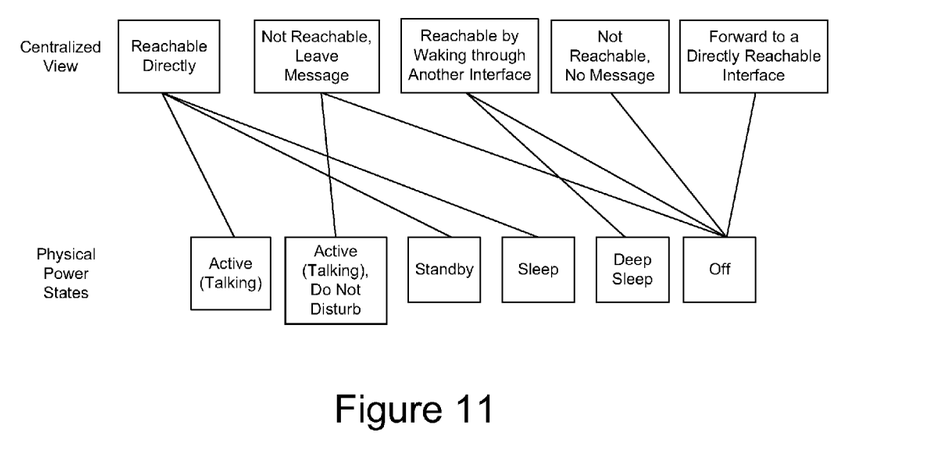
FIG. 11 illustrates an alternative embodiment reachability mapping.

In different embodiments, the centralized reachability states may be modified or subdivided accordingly. For example, the state of "not reachable" may be subdivided into "not reachable but may leave message" and "not reachable and not taking messages." The state of "reachable via another interface" may be subdivided into "reachable by forwarding to another interface" and "reachable by first being waked via another interface." An example of such an embodiment is illustrated by the example mapping shown in FIG. 11, which shows each reachability state of an interface may be mapped to a physical state or states of the interface in its own network technology. For example, the "reachable directly" state is mapped to physical power states of "active," "standby," and "sleep." In one embodiment, the active mode corresponds to the case where a user is talking or actively exchanging data with a network and is able to receive signaling of new incoming call. The "standby" and "sleep" modes correspond power states in which the interface is idle or sleeping, yet is capable or being woken up to receive incoming call. The "forward to a directly reachable interface" overlay state is mapped to one which is "off" but may be activated via a "reachable directly" interface over another network and/or another interface. The "not reachable, leave message" state is mapped to one that is "active" while not wanting to be interrupted or to an "off" state that does not want to be activated via another interface. The "reachable by waking though another interface" state is mapped to a physical "deep sleep" mode state and an "off" state. The "Not reachable no message" state is mapped to an "off" state in which the user device does not want any network access. In alternative embodiments of the present invention, centralized states, physical power states, and their respective mappings can differ from those depicted in FIG. 10.

In one embodiment, the centralized reachability state of each interface contains the relevant information provided to the network. While the specific interface may be in a state of active, idle, sleep, off, etc., what is relevant to the network in this embodiment is whether the device may be contacted through that particular interface. These centralized reachability states therefore provide a common platform of power management states even for a heterogeneous network environment.

Figure 12:
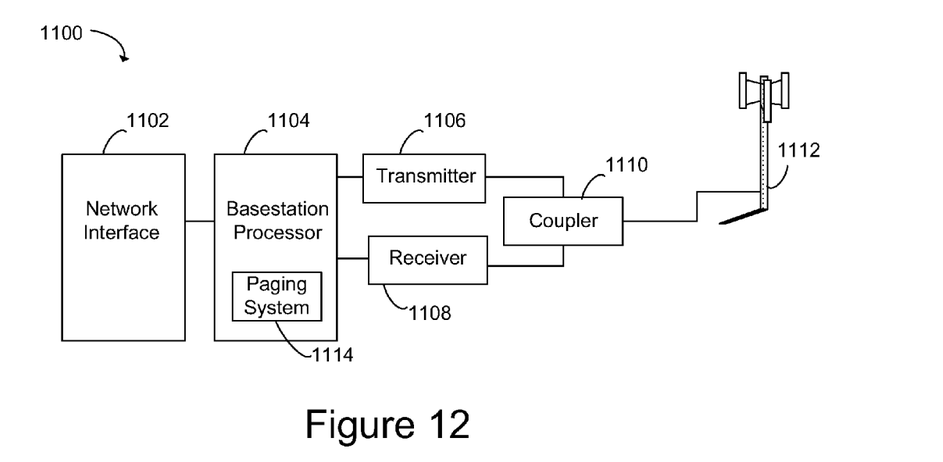
FIG. 12 illustrates an embodiment base station.

In an embodiment, management of centralized reachability states is implemented in wireless base station 1100, as shown in FIG. 12. Base station 1100 has a base station processor 1104 coupled to transmitter 1106 and receiver 1108, and network interface 1102. Transmitter 1106 and receiver 1108 are coupled to antenna 1112 via coupler 1110. In embodiments of the present invention, base station 1100 may operate, for example, in a LTE network using an OFDMA downlink channel, in an IEEE 802.11 network, IEEE 802.16 network, or in a 3GPP network, as examples. In alternative embodiments, other systems, network types and transmission schemes can be used, for example, Wimax, and/or 1XEV-DO.

In embodiments of the present invention, base station processor 1104 tracks centralized reachability states for its own user devices by consulting another centralized reachablity table shared by participating networks, or the centralized reachability table can be managed and executed by basestation processor 1104 and shared with other networks. In one example, basestation processor 1104 implements embodiment algorithms within paging system 1114 or via a separate reachability control system. In alternative embodiments, paging system 1114 and/or the reachability control system can be implemented using separate hardware and or processing devices. In further embodiments, the centralized reachability states can be shared or distributed among processors in different networks, or by a dedicated remote processor reachable by a wireline or wireless network, or via the Internet.

Figure 13:
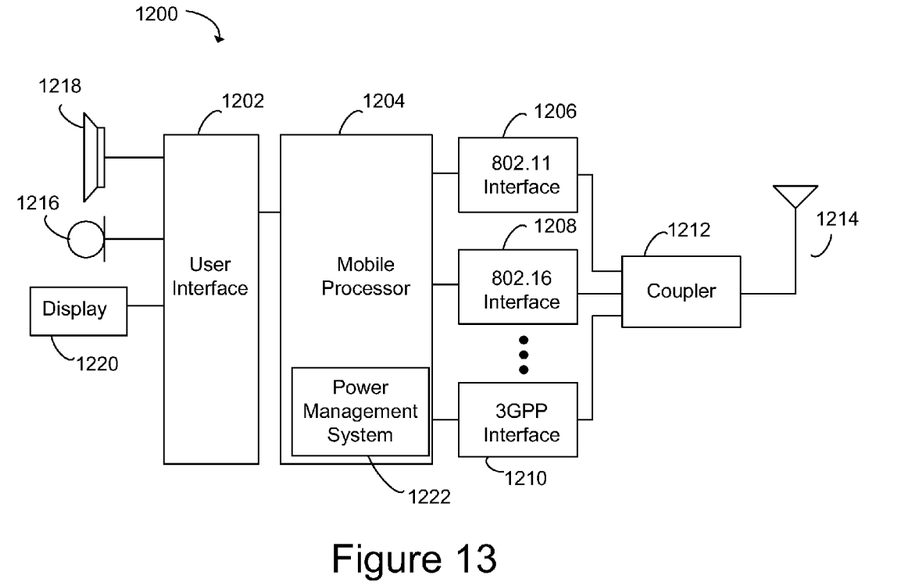
FIG. 13 illustrates an embodiment user device.

A block diagram of an embodiment multiple-interface user device 1200 is illustrated in FIG. 13. User device 1200 can be implemented, for example, as a cellular telephone, or other mobile communication device, such as a computer or network enabled peripheral. Alternatively, user device 1200 can be a non-mobile device, such as a desktop computer with wireless network connectivity. User device 1200 has mobile processor 1204, IEEE 802.11 interface 1206, IEEE 802.16 interface 1208 and 3GPP interface 1210. Each of these interfaces includes a transmitter and a receiver. In alternative embodiments, different combinations of greater or fewer interfaces can also be used. The output of each interface 1206, 1208 and 1210 are coupled to antenna 1214 via coupler 1212. Alternatively, some of the interfaces may be coupled to their own individual antennas. In further embodiments, one of more of these interfaces may comprise a wired interface such as a LAN connection, such as a Fast Ethernet connection, a wired WAN connection, Internet, or other interface.

User interface 1202 is coupled to mobile processor 1204 and provides interfaces to loudspeaker 1218, microphone 1216 and display 1220, for example. Alternatively, user device 1200 may have a different configuration with respect to user interface 1202, or user interface 1202 may be omitted entirely.

In an embodiment, mobile processor 1204 implements power management system 1222 that controls the power states of interfaces 1206, 1208 and 1210 according to embodiment described herein. Alternatively, power management system 1222 can be implemented using a separate circuit and/or processor.

In an embodiment, centralized reachability states provide a common platform for all interfaces to enable one to determine the optimum power configuration. All the different interfaces with different network technologies may use this common platform to optimize the power consumption of the multiple-interface device.

In an embodiment centralized power management system, reachability states provide a common platform for all interfaces and the networks to enable the system to determine the optimum power configuration. Different networks may therefore be involved to aid in the centralized power management scheme. The different networks and the different interfaces may exchange messages using a common platform. Such a platform may be, but is not limited to, platforms using IEEE Std 802.21 and its extensions.

In one embodiment, a single-interface device may be considered one particular case of a multiple-interface device. Therefore, embodiment centralized power management systems methods may be applied to a single-interface device. In another embodiment, centralized power management for a multiple network interface device requires no changes or minimal changes to existing power management for each network technology. In further embodiments, the system provides centralized power management for a multiple-interface device.

In an embodiment, physical power states of an interface may vary in numerous physical parameters, but the relevant information used by the network is whether and how the network may communicate with the device. An embodiment method defines centralized power management states according to such relevant information used by the network. In another embodiment method, centralized power management states are mapped into the physical power states of the interface in the individual network technology.

In an embodiment, centralized power management systems and methods provide a common platform to manage power for a multiple-interface device even in a heterogeneous network environment. Centralized power management enables network participation to optimize the power consumption (i.e., battery life) even for a multiple-interface device in a heterogeneous network environment. Furthermore, centralized reachability states are defined to describe the power management configuration of a multiple-interface device in a heterogeneous network environment.

In an embodiment, a common reachability platform describes the power configuration of multiple-interface devices in a heterogeneous network environment. One embodiment common platform defines centralized power management reachability states of multiple-interface device to enable a common power management system that is a centralized power management of existing power management states of individual networks without requiring changes to the existing power management in each network technology.

In an embodiment method, centralized reachability states of each interface are mapped to the physical power management state of that interface defined in its own network technology.

In an embodiment, a power state mapping system enables a user device and a network to individually implement power reduction and power state assignment. In such an embodiment, the network does not need to deal with the details of the physical power saving states (sleep, idle, etc.) of the individual used device and/or network technology. Instead, the user device may simply abstract these states as "reachable directly," "reachable via another interface," and/or other states. These abstract states are known by the manufacturer of the network equipment, so that the network manufacturer can implement these in the network. In an embodiment, these states are also independent of the vendor who makes the user device. Therefore, in an embodiment, these abstract states are both technology independent and vendor independent.

In an embodiment, reachability states are communicated both from the user device to the network and from the network to the user device. For example when a user device desires to place its various interfaces in certain states, which may be technology specific for each interface, these states are translated into embodiment availability states and passed to the network. The network then acts accordingly once this information is received. If, for example, the network requires the user device to be reachable, the network uses the reachability states to determine how to contact the user device (i.e., either directly or indirectly via another network), and how to assign interface states (i.e. sleep mode, idle mode, off, etc.).

In an embodiment, a method of operating a user device includes receiving a transmission from a first wireless network on a first wireless interface while the first wireless interface is in a reachable state and the second wireless interface is in a non-reachable state. The first wireless interface is configured to communicate with a first wireless network and the second wireless interface is configured to communicate with a second wireless network. The transmission includes a message that a second wireless network needs to access the second wireless interface. The method also includes placing the second wireless interface into a reachable state after receiving the transmission. In an embodiment, the second wireless interface communicates with the second wireless network after placing the second wireless interface into the reachable state. In a further embodiment method, the reachable state includes a power-on state and the non-reachable state includes a power-down state.

In an embodiment, a method of operating a wireless base station configured to transmit to user devices on a first network includes determining a reachability state of a first wireless user device. If the first wireless user device is in a reachable directly state, based on the determining, a message is sent to the first wireless user device via the first network. If the first wireless user device is in a reachable via another interface state, a message is forwarded to a second wireless network in which the first wireless user device is in a reachable directly state. In an embodiment, the method further includes terminating a transmission if the first wireless user device is in a not reachable state. In a further embodiment, determining the state of the first wireless user device includes looking up reachability states in a centralized map.

In an embodiment method, the reachability states include a "reachable directly state," a "reachable via another interface state," and a "not reachable state." In a further embodiment, the reachability states are further mapped to physical power states of the user devices. In one embodiment method the first network is a 802.11 network, and the first user device is in the reachable directly state when a first interface of the first user device is in an in-service mode, a power save mode, or in an extended power save mode. The first user device is in the reachable via another interface state when the first interface of the first user device is shut off or out of range of the first network, the first user device is reachable via a second interface configured to communicate with the second network. On the other hand, the first user device is in a not-reachable state when the first interface of the first user device is shut off or out of range of the first network. In this case, the first user device is not reachable via the second interface configured to communicate with the second network.

In an embodiment, the method further includes forwarding a message to a third wireless network in which the first wireless user device is in a reachable directly state if the first wireless user device is in a reachable via another interface state and the first wireless user device is not in a reachable state with respect to the second wireless network. A further embodiment method includes the wireless base station assigning power mode states to the first user device based on reachability states in a centralized map. In one embodiment, method, the power mode states include: an active, idle or power-save mode for a first interface of the first user device, where the first interface is configured to operate with the first network; and a power-down mode for a second interface of the first user device, where the second interface is configured to operate with the second network.

An embodiment method for managing power of user device having an interface includes mapping centralized reachability states to physical power states of the interface, and controlling the physical power states based on the mapping. Controlling includes transmitting a signal to the user device. In a further embodiment, the device includes a plurality of wireless interfaces. In yet a further embodiment, the centralized reachability states include a reachable directly state, a reachable via another interface state, and a not reachable state.

In one embodiment method, the reachable directly state is mapped into a physical power state of the interface that enables the user device to receive a transmission on the interface, and the reachable via another interface state is mapped into a physical power state of the interface comprising a power-down state. In a further method, the user device further includes at least one additional interface, and controlling the physical power states includes assigning the physical power state to the interface that enables the user device to receive a transmission on the first interface, and assigning the power-down state to the at least one additional interface. In one example, mapping is performed on a base station processor.

In an embodiment, a wireless communications system includes a first base station on a first network, where the first base station is configured to communicate with a second base station on a second network. The first base station is configured to communicate with a user device having a first interface and a second interface, the first interface configured to communicate with the first network, and the second interface configured to communicate with the second network. The wireless communications system also includes a map of centralized reachability states and corresponding power states for the user device. The reachability states include a reachable directly state, a reachable via another interface state, and a not reachable state. In one embodiment, a corresponding power state for the reachable directly state includes an active mode for the first interface. In a further embodiment, the corresponding power state for the reachable directly state further includes a power down-mode for the second interface.

In one embodiment, the first base station forwards messages from the second base station to the first interface when the user device is in the corresponding power state for the reachable directly state. In a further embodiment, a corresponding power state for the reachable via another interface state includes a power-down mode for the first interface and an active mode for the second interface. In one example, the first base station forwards a message to the second base station to be transmitted by the second base station to the second interface of the user device when the user device is in the corresponding power state for the reachable via another interface state. In another embodiment, the first base station transmits a corresponding power state to the user device.

Advantages of the embodiments of the present invention include better optimization of power consumption than when the power consumption is optimized only within each individual technology. Furthermore, a centralized power management design makes it possible not to change existing power management in individual networks, since such modifications usually may not be practical or may be difficult to standardize.

Although present embodiments and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for managing power of a user device having a plurality of interfaces, the method comprising:
    exchanging information regarding centralized reachability states with a base station, the centralized reachability states defining vendor and technology independent descriptions of power and reachability modes of the user device;
    determining a first set of centralized reachability states, wherein the centralized reachability states comprise a reachable directly state, a reachable via another interface state, and a not reachable state, and wherein
        the user device is in the reachable directly state when a first interface of the user device is in an in-service mode, a power save mode, or in an extended power save mode,
        the user device is in the reachable via another interface state when the first interface of the user device is shut off or out of range of a first wireless network, and the user device is reachable via a second interface configured to communicate with a second wireless network, and the user device is in the not reachable state when the first interface of the user device is shut off or out of range of the first wireless network, and the user device is not reachable via the second interface configured to communicate with the second wireless network;

mapping the first set of centralized reachability states to physical power states of the plurality of interfaces; and controlling the physical power states of the plurality of interfaces based on the mapping, the controlling comprising controlling one of the plurality of interfaces in accordance with a signal received from the base station via another one of the plurality of interfaces.

2. The method of claim 1, wherein the first wireless network comprises an 802.11 network.

3. The method of claim 1, wherein mapping is performed on a mobile processor of the user device.

4. The method of claim 2, further comprising:

mapping the reachable directly state of the first interface to a physical power state of the first interface that enables the user device to receive a transmission via the first interface; and mapping the reachable via another interface state of the second interface to a physical power state of the second interface that powers down the second interface.

5. The method of claim 4, wherein controlling the physical power states comprises:

assigning the physical power state of the first interface to the interface that enables the user device to receive the transmission via the first interface, and assigning the physical power state of the second interface that powers down the second interface.

6. A method of operating a user device comprising a first wireless interface configured to communicate with a first wireless network and second wireless interface configured to communicate with a second wireless network, the method comprising:

exchanging information regarding centralized reachability states with a base station, wherein:

the centralized reachability states define vendor and technology independent descriptions of power and reachability modes of the user device, and the centralized reachability states comprise a reachable directly state, a reachable via another interface state, and a non-reachable state, wherein the user device is in the reachable directly state when the first interface of the user device is in an in-service mode, a power save mode, or in an extended power save mode, the user device is in the reachable via another interface state when the first interface of the user device is shut off or out of range of the first wireless network, and the user device is reachable via the second interface configured to communicate with the second wireless network, and the user device is in the not-reachable state when the first interface of the user device is shut off or out of range of the first wireless network, and the user device is not reachable via the second interface configured to communicate with the second wireless network;

receiving a transmission from the first wireless network on the first wireless interface while the first wireless interface is in the reachable state and the second wireless interface is in the non-reachable state, the transmission comprising a message that the second wireless network needs to access the second wireless interface; and placing the second wireless interface into the reachable state in accordance with the transmission received on the first wireless interface.

7. The method of claim 6, further comprising the second wireless interface communicating with the second wireless network after placing the second wireless interface into the reachable state.

8. The method of claim 6, wherein the reachable state comprises a power-on state and the non-reachable state comprises a power-down state.

9. A method of operating a wireless base station configured to transmit to user devices on a first wireless network, the method comprising:

exchanging information regarding centralized reachability states with a first wireless user device, wherein:

the centralized reachability states define vendor and technology independent descriptions of power and reachability modes of the first wireless user device, and the centralized reachability states comprise a reachable directly state, a reachable via another interface state, and a not-reachable state;

determining a centralized reachability state of the first wireless user device, wherein the first wireless user device is in the reachable directly state when a first interface of the first wireless user device is in an in-service mode, a power save mode, or in an extended power save mode, the first wireless user device is in the reachable via another interface state when the first interface of the first wireless user device is shut off or out of range of the first wireless network, and the first wireless user device is reachable via a second interface configured to communicate with a second wireless network, and the first wireless user device is in the not-reachable state when the first interface of the first wireless user device is shut off or out of range of the first wireless network, and the first wireless user device is not reachable via the second interface configured to communicate with the second wireless network;

when the first wireless user device is in the reachable directly state, based on the determining, sending a first message to the first wireless user device via the first wireless network; and when the first wireless user device is in the reachable via another interface state, forwarding a second message to the second wireless network in which the first wireless user device is in the reachable directly state, wherein the second message comprises an indication for changing a power mode state of the first interface of the first wireless user device, and wherein the wireless base station is coupled to the first interface via the first wireless network.

10. The method of claim 9, further comprising terminating a transmission when the first wireless user device is in the not-reachable state.

11. The method of claim 9, wherein determining the centralized reachability state of the first wireless user device comprises looking up reachability states in a centralized map.

12. The method of claim 9, wherein the centralized reachability states are further mapped to physical power states of the user devices.

13. The method of claim 9, further comprising when the first wireless user device is in the reachable via another interface state and the first wireless user device is not in the reachable state with respect to the second wireless network, forwarding a third message to a third wireless network in which the first wireless user device is in the reachable directly state.

14. The method of claim 9, further comprising assigning power mode states to the first user device based on reachability states in a centralized map, wherein assigning the power mode states is performed by the wireless base station.

15. The method of claim 9, wherein determining the centralized reachability state of the first wireless user device is performed by a paging system of the first network.

16. The method of claim 9, wherein the centralized reachability state of the first user device is independent of a technology of the first wireless network, a technology of the second wireless network, and a vendor of the first wireless user device.

17. The method of claim 12, wherein
the first network comprises an 802.11 network.

18. The method of claim 14, wherein the power mode states comprise:
   an active, idle or power-save mode for the first interface of the first user device, wherein the first interface is configured to operate with the first network; and
   a power-down mode for the second interface of the first user device, wherein the second interface is configured to operate with the second network.

19. A wireless communications system comprising:
   a first base station configured to operate on a first wireless network, the first base station comprising a processor operable to
      communicate with a second base station on a second wireless network, and
      communicate with a user device having a first interface and a second interface, the first interface configured to communicate with the first wireless network and the second interface configured to communicate with the second wireless network;
      determine power states for the user device based on a map of centralized reachability states and corresponding power states for the user device, wherein the centralized reachability states define vendor and technology independent descriptions of power and reachability states of the user device, and the centralized reachability states comprise
         a reachable directly state,
         a reachable via another interface state, and
         a not reachable state, wherein
            the user device is in the reachable directly state when the first interface of the user device is in an in-service mode, a power save mode, or in an extended power save mode,
            the user device is in the reachable via another interface state when the first interface of the user device is shut off or out of range of the first wireless network, and the user device is reachable via the second interface configured to communicate with the second wireless network, and
            the user device is in the not reachable state when the first interface of the user device is shut off or out of range of the first wireless network, and the user device is not reachable via the second interface configured to communicate with the second wireless network; and
      control a power state of one of the first and second interfaces of the user device with a signal sent to the other one of the first and second interfaces.

20. The wireless communications system of claim 19, wherein a corresponding power state for the reachable directly state with respect to the first network comprises an active mode for the first interface and a power down-mode for the second interface.

21. The wireless communications system of claim 19, wherein a corresponding power state for the reachable via another interface state with respect to the first network comprises a power-down mode for the first interface and an active mode for the second interface.

22. The wireless communications system of claim 19, wherein the first base station is configured to transmit to the user device a power state corresponding to a centralized reachability state.

23. The wireless communications system of claim 20, wherein the first base station forwards messages from the second base station to the first interface when the user device is in the corresponding power state for the reachable directly state with respect to the first network.

24. The wireless communications system of claim 21, wherein the processor of the first base station is configured to forward messages to the second base station to be transmitted by the second base station to the second interface of the user device when the user device is in the corresponding power state for the reachable via another interface state with respect to the first network.

* * * * *